(12) United States Patent
Keorkunian et al.

(10) Patent No.: US 7,111,078 B2
(45) Date of Patent: Sep. 19, 2006

(54) SYSTEM AND METHOD FOR ANONYMOUS OBSERVATION AND USE OF PREMIUM CONTENT BY INDIRECT ACCESS THROUGH PORTAL

(75) Inventors: Gary S. Keorkunian, 107 Henning Dr., North Wales, PA (US) 19454; Steven B. Hirst, 2406 New Market Square South, Bensalem, PA (US) 19020; Melodie Waldron, 761 Walnut Ct., Bensalem, PA (US) 19020

(73) Assignees: Steven B. Hirst, Bensalem, PA (US); Melodie Waldron, Bensalem, PA (US); Gary S. Keorkunian, North Wales, PA (US)

( * ) Notice: Subject to any disclaimer, the term of this patent is extended or adjusted under 35 U.S.C. 154(b) by 816 days.

(21) Appl. No.: 09/753,714

(22) Filed: Jan. 4, 2001

(65) Prior Publication Data

US 2004/0073631 A1    Apr. 15, 2004

Related U.S. Application Data

(60) Provisional application No. 60/174,377, filed on Jan. 4, 2000.

(51) Int. Cl.
  G06F 15/16    (2006.01)
  G06F 15/173   (2006.01)
  G06F 17/21    (2006.01)
(52) U.S. Cl. .............. 709/246; 709/225; 709/239; 715/540
(58) Field of Classification Search ............. 709/219, 709/229, 225, 239, 246; 705/78; 715/540, 715/530
See application file for complete search history.

(56) References Cited

U.S. PATENT DOCUMENTS

| | | | |
|---|---|---|---|
| 5,550,984 A | | 8/1996 | Gelb |
| 5,673,322 A | | 9/1997 | Pepe et al. |
| 5,729,537 A | | 3/1998 | Billström |
| 5,742,762 A | | 4/1998 | Scholl et al. |
| 5,768,391 A | | 6/1998 | Ichikawa |
| 5,774,869 A | | 6/1998 | Toader |
| 5,806,043 A | * | 9/1998 | Toader ................... 405/14 |
| 5,812,769 A | | 9/1998 | Graber et al. |
| 5,819,285 A | | 10/1998 | Damico et al. |
| 5,889,952 A | * | 3/1999 | Hunnicutt et al. ......... 709/219 |
| 5,961,593 A | | 10/1999 | Grabber et al. |

(Continued)

FOREIGN PATENT DOCUMENTS

WO        99/09725        2/1999

*Primary Examiner*—Paul H. Kang
(74) *Attorney, Agent, or Firm*—Blank Rome LLP (57) ABSTRACT

A method and system allow anonymous observation of premium content. A purchaser (user) of premium content connects and logs in to the server system via the Internet or other electronic medium. The server presents the user with a number of options for viewing or otherwise observing premium content (i.e. HTML Document, Video or Audio Stream, etc.) from a variety of providers. Through these options the user submits a request for an item of content to the server. The server then retrieves the content from the content provider's system or from a local cached version. If the content contains links (i.e. HTML Links) to other items of content at the provider, the server changes these links into links that request the same content from the server. The content is then delivered to the user's observation device (i.e. Web Browser, Telephone, etc.).

10 Claims, 8 Drawing Sheets

E-Nect Method - Activity Diagram

U.S. PATENT DOCUMENTS

| | | | |
|---|---|---|---|
| 5,996,011 A * | 11/1999 | Humes | 709/225 |
| 6,092,198 A * | 7/2000 | Lanzy et al. | 713/201 |
| 6,173,311 B1 | 1/2001 | Hassett et al. | |
| 6,529,886 B1 * | 3/2003 | Campana et al. | 705/78 |
| 6,539,381 B1 * | 3/2003 | Prasad et al. | 707/10 |
| 2002/0004900 A1 * | 1/2002 | Patel | 713/155 |
| 2003/0191846 A1 * | 10/2003 | Hunnicutt et al. | 709/229 |

* cited by examiner

Figure 1
E-Nect Component Diagram

Figure 3
E-Nect Application Server Component Class Diagram

Figure 4
E-Nect Database Model

This Entity Relationship Diagram shows database table and relationship structures for the E-Nect Database.

Figure 5
E-Nect Method - Use Case Diagram

Figure 6
E-Nect Method – Activity Diagram

Figure 7
E-Nect Method - Collaboration Diagram

SYSTEM AND METHOD FOR ANONYMOUS OBSERVATION AND USE OF PREMIUM CONTENT BY INDIRECT ACCESS THROUGH PORTAL

REFERENCE TO RELATED APPLICATION

The present application claims the benefit of U.S. Provisional Application No. 60/174,377, filed Jan. 4, 2000, whose disclosure is hereby incorporated by reference in its entirety into the present disclosure.

BACKGROUND OF THE INVENTION

1. Technical Field

The present invention pertains in general to computer software, and more particularly, to providing the components that give Internet based and other technology based providers the ability to charge fees for content, while allowing users to maintain their anonymity.

2. Description of Related Art

With the growth of the Internet, and particularly of the World-Wide Web, many companies have offered premium content over the Internet. To access such premium content, a user must typically enter a credit-card number, both for billing purposes and (when required) to establish proof of legal maturity.

However, companies providing such premium content may wish to allow customers a free, time-limited preview of the content. In that case, there must be a way of ensuring that the person using the preview does so only during the specified time. A generic guest ID and password allow no such function. While the user can be prompted to enter a credit card, with the promise that the card will not be charged during the preview period, many users are understandably suspicious of such a promise.

Also, a user may wish to remain anonymous during the preview period, or for that matter throughout the user's subscription to the premium service. That is especially the case with "adult" services. The user's anonymity can be breached in several ways. For example, when the user's computer forms a TCP/IP connection to the server, the user's computer sends certain identifying information to the server, which stores that information in an access log. Such information can be used to identify the user. Also, if another person (such as a family member or a co-worker) accesses the user's computer, that other person can easily identify the URL's of the last several Web sites that the user has accessed. Further, in the case of premium content, a charge will appear on the user's credit-card statements. Many users find such recording of their identities objectionable. On the other hand, companies providing premium content still have to be able to charge their customers.

SUMMARY OF THE INVENTION

It will thus be readily apparent that a need exits in the art to overcome the above problems. It is therefore an object of the invention to allow users to access premium content for a limited time. It is another object of the invention to allow users to access premium (or other) content on the Web while obscuring their identity to both the server and the Web browsers running on such users' computers.

More specifically, the present invention has the following objects:

1. To provide Providers with an outlet for selling their Content to anonymous Users.
2. To provide Providers with the ability to promote their Content by giving free access to Content for a limited time.
3. To provide Users with the ability to purchase Content from a variety of Providers while remaining anonymous.
4. To provide Users with the ability to access that Content while remaining anonymous. To provide Portals with the ability to gather information about the Content being viewed so Providers can be paid accordingly To achieve the objects outlined above, as well as other objects, the present invention is directed to a method and system, usable with the World Wide Web and other communication technology, for anonymously delivering content to users, while giving the providers the ability to charge for the content, as well as for delivering such content to users free of charge for a limited time.

The present invention disclosed and claimed herein, comprises a method and system for allowing users to purchase for the right to anonymously view or otherwise observe premium content or use premium services available from a variety of providers.

The present invention would typically be implemented through portals, so that the users do not access the content directly. The portal provides a variety of providers with an outlet to sell content or services (hereafter called content) to an anonymous user base. The portal would charge customers (hereafter called users) for the right to view the content available from the providers. The portal will maintain the information about the content, however, not the specifics on the user who purchased it. This permits the users to maintain their anonymity, while allowing the portal to charge fees for the content. The fees can be waived during an initial preview period, if a provider so desires.

Viewing as used herein refers to the ability to obverse the content (i.e. look at web pages, read text, view still images or motion pictures, listen to audio, etc.). In addition, this system can apply to other observations such as tasting, smelling, and feeling if and when techniques capable of transmitting this content electronically are developed.

Instead of users purchasing the content directly from the providers—where their anonymity would be compromised—users purchase content anonymously through the portal. The portal serves as an outlet for several providers. When users access the portal they are presented with links to content from a variety of providers. When users use that content, they are not physically visiting the provider's site, as this may compromise their anonymity. Instead, the portal using the method described herein retrieves the content, either from the provider's site directly or from a cached or local copy of the content, and transmits it to the user. In addition, the portal using the method described herein could establish a non-traceable link between the user and provider for the content to be transmitted. If the content delivered contains links to additional content, the system provides for the link to be reformatted before displaying the content to the user. As users view the content, their account with the portal is charged accordingly; however, the specific content that they are viewing is not tracked.

As content is used, the provider's account is credited, again with no tracking of information about the specific user using the content. This provides the portal with the tracking method and system necessary to pay providers for the content that is viewed by the portal's users. Portals and providers can charge users using a "charge-for-item" method or a "charge-per-time" method. The former method would charge users a specified amount for using a specific item of content. The latter method would charge users a specified amount per minute for spending time with the content.

In addition to purchasing content through the portal, users can acquire access via other means as well. The portal, possibly in conjunction with providers, can setup a number of predefined accounts with a preset limit of time or content usage allowed. The user can then purchase these accounts for cash or other means from retailers. The retailer would supply the user with the account number, password and time or content limit. This information can be supplied via a small card similar to long distance phone cards currently available. The providers may also use these cards to promote their services by giving away cards to prospective customers.

Users of the service can purchase content credits in two ways. First, by establishing an account with the provider and purchasing credits using a credit card over the Internet or other medium. Second, by purchasing a pre-paid account for cash or other means in a form similar to pre-paid phone cards. The second method provides even greater anonymity to the user in that the provider, as well as the content provider, is unaware of the user's identity.

The present invention thus allows anonymous observation of premium content. A purchaser (user) of premium content connects and logs in to the server system via the Internet or other electronic medium. The server presents the user with a number of options for viewing or otherwise observing premium content (i.e. HTML Document, Video or Audio Stream, etc.) from a variety of providers. Through these options the user submits a request for an item of content to the server. The server then retrieves the content from the content provider's system or from a local cached version. If the content contains links (i.e. HTML Links) to other items of content at the provider, the server changes these links into links that request the same content from the server. The content is then delivered to the user's observation device (i.e. Web Browser, Telephone, etc.). For content that is live or provided interactively by the content provider, the server establishes an anonymously routed connection to the content provider. If the item fee is based on the amount of time the user spends observing the content, then the server begins a timer. When the user concludes the observation of the content the user's account is debited for the amount of the fee. The provider's account is credited for the content viewed. The user makes all payments to the provider. The provider makes all payments to the providers. There are no direct payments made from the user to the content provider and no records are maintained of the user's content selection, therefore ensuring anonymity. In addition, the user's records (i.e. Web Browser History Files, Phone Records, etc.) will only reveal a connection to the provider and not the content provider.

BRIEF DESCRIPTION OF THE DRAWINGS

The Description of the Invention and Preferred Implementation makes reference to the schematics and models. These include the following:

FIG. 1—Component Diagram

This UML Package Diagram shows an overview of the logical design of the complete System in the preferred three-tier, component-based architecture.

FIG. 2—Deployment Diagram

This UML Deployment Diagram shows one of the possible physical deployment methods for a complete System.

FIG. 3—Application Server Component Class Diagram

This UML Class Diagram shows the association between classes in the Application Server Component.

FIG. 4—Database Model

This Entity Relationship Diagram shows the database table and relationship structures for the Database.

FIG. 5—Method—Use Case Diagram

This UML Use Case Diagram shows the primary user interactions with the System.

FIG. 6—Method—Activity Diagram

This UML Activity Diagram shows the Method for retrieving and/or connecting anonymous Users to premium Content from Providers FIG. 7—Method—Collaboration Diagram This UML Collaboration Diagram shows the interaction of Application Server objects used to enact the Method for retrieving and/or connecting anonymous Users to premium Content from Providers.

FIG. 8—Method—Sequence Diagram

This UML Sequence Diagram shows the interaction of Application Server objects used to enact the Method for retrieving and/or connecting anonymous Users to premium Content from Providers, and other related processes.

DETAILED DESCRIPTION OF THE INVENTION

The preferred implementation of the system is herein set forth in detail with reference to diagrams and schematics. The descriptions reference the diagrams using reference numbers as identified in the diagrams and schematics. Reference numbers in this section are surrounded by square brackets [ ].

Logical Component Design and Architecture

Figure 1:
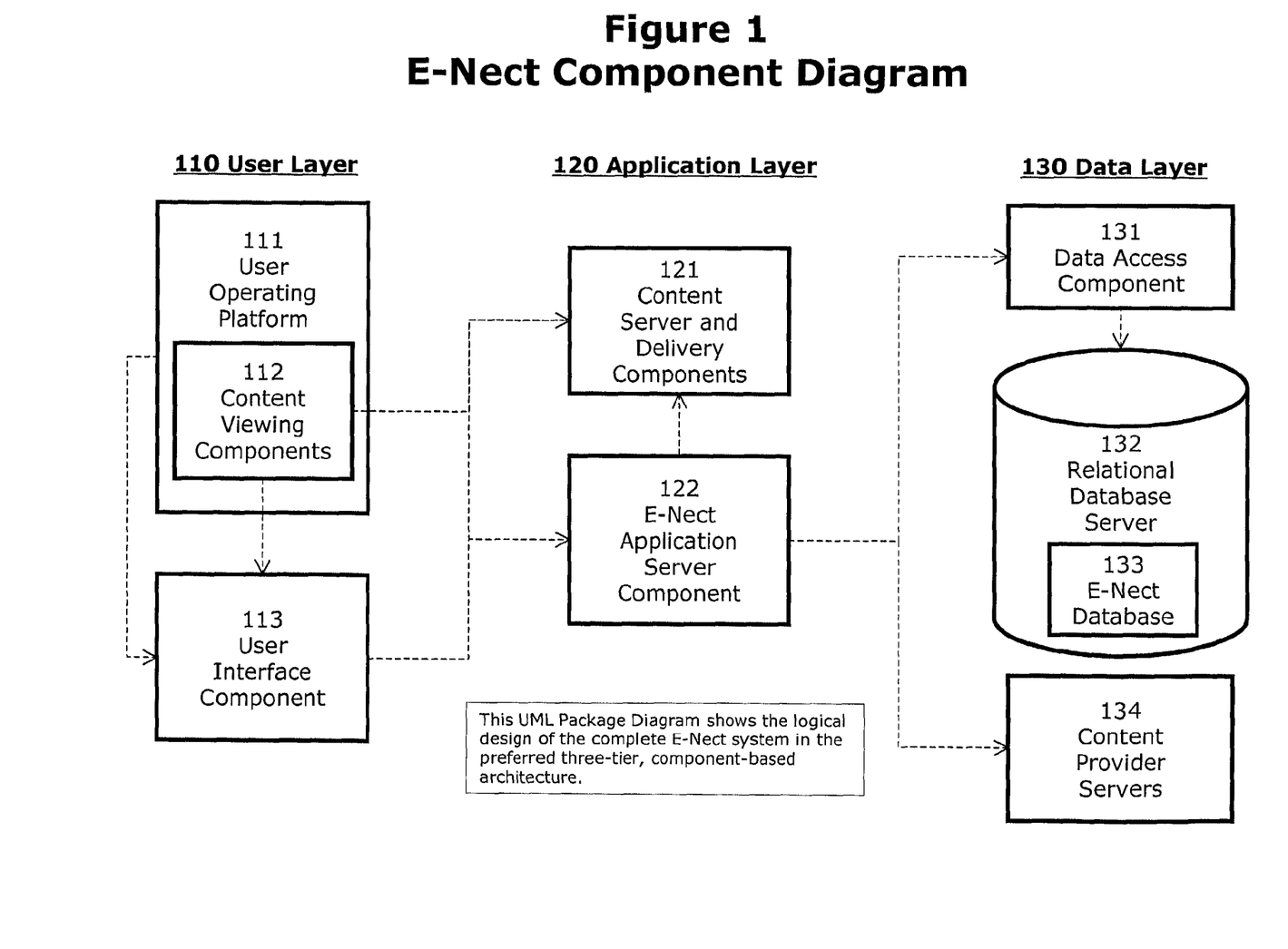

The preferred implementation of the system is that of three-tier, component-based architecture as outlined in FIG. 1—Component Diagram. The system is organized into three distinct logical layers: the User Layer [110], the Application Layer [120], and the Data Layer [130].

Components in the User Layer [110], in response to actions by the User, submits requests to components in the Application Layer [120], which in turn processes the requests and returns the requested information to the User Layer [110]. In processing requests from the User Layer [110], components in the Application Layer [120] may submit requests to components in the Data Layer [130], which in turn processes the request and returns the requested information to the Application Layer [120]. In addition to submitting requests to the Data Layer [130], the Application Layer [120] may submit requests to Provider Content Servers [134] for Content. Content returned by these servers to the Application Layer [120] would then be passed on to the User Layer [110].

Components with in a given layer will also collaborate to achieve that layer's objective.

The User Layer

The User Layer [110] embodies the user interface and presentation logic of the system. It consists of the following components: User Operating Platform [111], Content Viewing Components [112], and the User Interface Component [113].

The User Operating Platform [111] is independent of the system and may include a variety of commercially available operating platforms (i.e. Windows 95/98/NT/2000, Macintosh, UNIX, Linux, set-top boxes, telephones, etc.). Its purpose is to provide the User with the ability to with access to the Internet or other network, and to provide the facilities to run the Content Viewing Components [112].

The Content Viewing Components [112] are also independent of the system and may include a variety of commercially available content viewing utilities (i.e. Microsoft Internet Explorer, Netscape Communicator, Adobe Acrobat, Real Player, etc.). Their purpose is to provide the User with ability to access the Portal and use available Content.

The User Interface Component [113] is a component developed and maintained by the Portal. It is independent of, but dependent on the Application Server Component [122]. Its responsibility is to accept input from the User and return content and other output to the User's Content Viewing Components [112]. Its operations should provide User's with the following features:
1. The ability to submit User log-in requests.
2. The ability to select Content for viewing.
3. The ability to load Content into a Content Viewing Component [112].
4. The ability to terminate the use of the Content.

For each User, the User Interface Component [113] should request a unique Connection object (described in more detail later) from the Application Server [122]. The User Interface Component [113] requests services from the Connection object that include but are not limited to log-in requests and Content requests.

Upon receiving results from these requests, it is the User Interface Component's [113] responsibility to present the results to the User and provide a way for the User to interact with the Content.

The specific implementation of the User Layer [110] is based on the Content's format, the User Operating Platform [111], the Content Viewing Components [112], and the Content Server and Delivery Components [121].

The Application Layer

The Application Layer [120] embodies the business rules and application logic of the system. It consists of the following components: Content Server and Delivery Components [121] and the Application Sever Component [122].

The Content Server and Delivery Components [121] are also independent of the system and may include a variety of commercially available web service platforms and add-ins (i.e. Microsoft Internet Information Server, Active Server Pages, iPlanet Web Server, Cable Broadcast Systems, Telephone Systems, etc.).

The Application Server Component [122] is a core component of the system and is described in greater detail later.

The Data Layer

The Data Layer [130] embodies the data storage and retrieval logic of the system. It consists of the following components: Data Access Component [131] and Relational Database Management System [132], the Database [133] and Content Provider Servers [134].

The Data Access Component [131] is independent of the system and may be implemented using a variety of commercially available components and services (i.e. Microsoft DAO, Microsoft ADO, ODBC, JDBC, proprietary database API's, etc.). Its purpose is to provide programmers with an Application Programmer's Interface (API) for communicating with the Relational Database Management System [132] and manipulate data in the Database [133].

The Relational Database Management System (RDBMS) [132] is also independent of the system and may be implemented using a variety of commercially available RDBMS servers (i.e. Oracle, MS-SQL Server, IBM DB/2, etc.). Its purpose is to provide a mechanism to store information in the Database [133].

The Database [133] is a core component of the system and is described in greater detail below.

The Content Provider Servers [134] are independent of the system. These servers are maintained by the Providers of premium Content and can include a variety of commercially available products (i.e. web servers, file servers, database server, broadcast systems, telephone systems, etc.).

Physical Deployment Model

The preferred physical deployment model for the System is that of distributed system.

Figure 2:
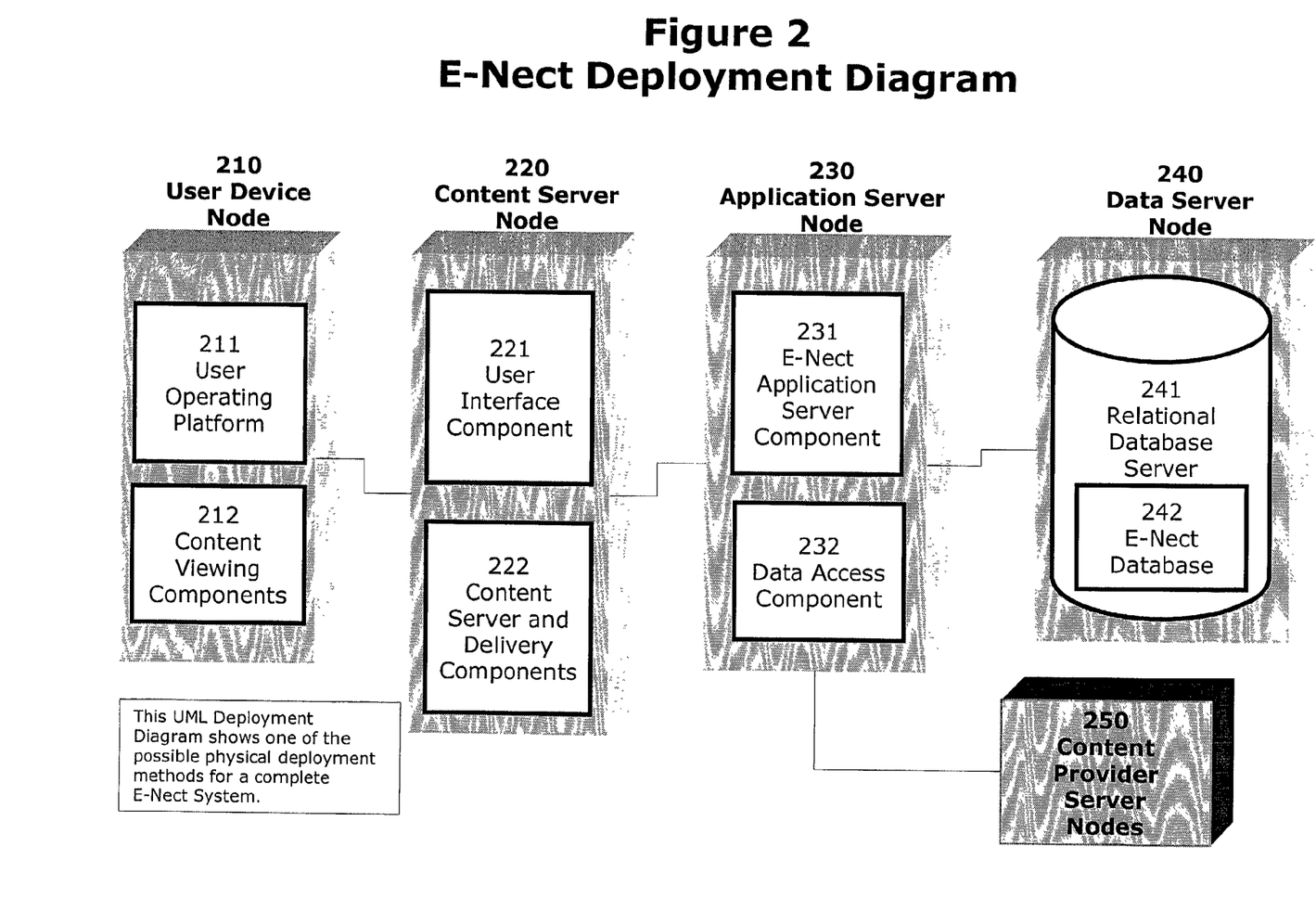

FIG. 2—Deployment Diagram outlines a typical implementation of that model.

The system can be deployed on up to 4 or more nodes (computers or other physical devices): User Device [210], Web Server [220], Application Server [230], and Database Server [240]. These devices are then connected using currently available network technology.

User Device Node

The users of a Portal maintain the User Device Node [210]. Components installed on this machine include the User Operating System [211], and the Content Viewing Components [212]. User devices may include but are not limited, personnel computers, televisions and set-top boxes, or telephones.

Content Server Node

The Portal maintains the Content Server Node [220]. Components installed on this machine include the Content Service Components [221] and the User Interface Component [222]. Content Servers may include but are not limited to web servers, database servers, file servers, electronic libraries or electronic broadcasting system.

Application Server Node

The Application Server [230] is maintained by the Portal. Components installed on this machine include the Application Server Component [231] and the Data Access Component [232].

Database Server Node

The Portal maintains the Database Server [240]. Components installed on this machine include the Relational Database Management System [241] and the Database [242].

Content Provider Server Nodes

The various Content Providers maintain the Content Provider Server Nodes [250].

These nodes may include a variety of server types and components including but not limited to web servers, file servers, database server, broadcast systems and telephone systems.

Alternative Deployment Methods

In addition to the deployment method outlined here and in FIG. 2, alternative deployment methods can be used. Alternative deployment methods may be selected based on factors such as the number of simultaneous users and the available technology for the given Content format.

In one alternative method, all components installed on the Content [221, 222], Application [231, 232], and Data [241, 242] Servers Nodes, as outlined above, can be installed instead on a single server machine, eliminating the need for two of the three machines maintained by the Portal.

In a second alternative, components installed on the Application Server Node [231, 232], as outlined above, can be installed instead with components on the Web Server Node [220], eliminating the need for a separate Application Server Node [230].

In a third alternative, components installed on the Application Server Node [231, 232], as outlined above, can be installed instead with the components on the Database Server Node [241, 242], eliminating the need for a separate Application Server Node [230].

In a fourth alternative, multiple instances of the Content [220] and Application [230] Server Nodes can be deployed to handle requests from large numbers of Users.

The Application Server Component

Figure 3:
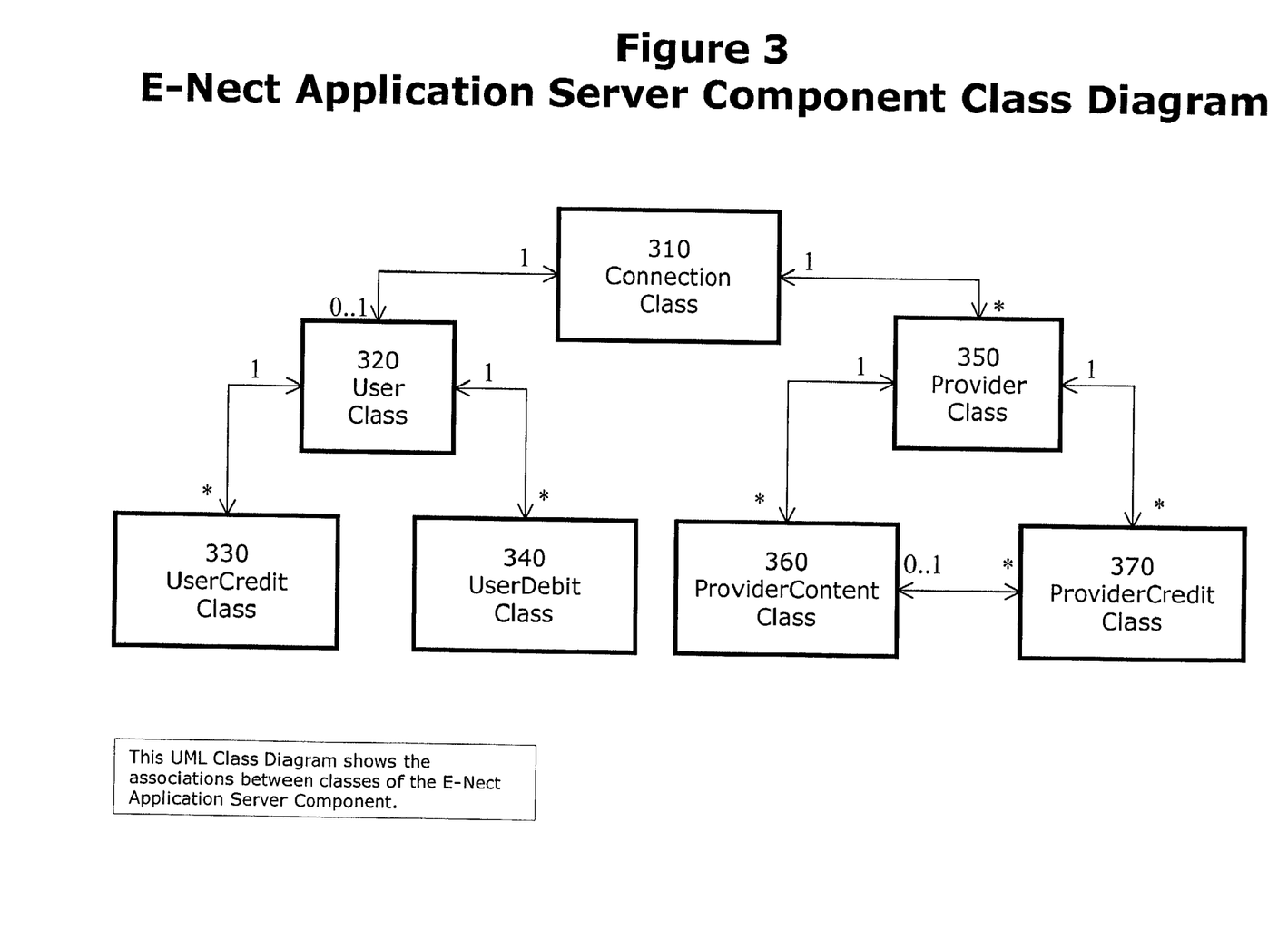

The preferred implementation is that of an object-oriented component as outlined in FIG. 3—Application Server Component Class Diagram.

Component Overview

The Application Server Component embodies the business rules and application logic of the System. This components has the following objectives:
1. Maintain the state of the data associated with systems entities.
2. Interact with Database for object and data persistence.
3. Maintain and enforce data integrity and security.
4. Maintain an accounting of User and Provider credit balances.
5. Retrieve, process and maintain cached versions of Provider Content.
6. Process Provider Content as follows: Convert links to additional Content into Content requests to the Application Server Component. This serves the purpose of keeping the User inside of the Portal, preventing them from viewing content directly from the Provider's Server, therefore maintaining anonymity.

To accomplish these objectives the preferred implementation organizes the component into the following class modules: Connection [310], User [320], UserCredit [330], UserDebit [340], Provider [350], ProviderContent [360], and ProviderCredit [370].

This component can be implemented using a variety of currently available object-oriented programming languages and technologies (i.e. C++, Visual Basic, COM, DCOM, Java, JavaBeans, CORBA, etc.).

The Connection Class

The Connection Class [310] represents the root class of the Application Server Component. It provides the following operations:
1. Maintains the state Connection objects.
2. Creates, retrieves and maintains User [320], UserCredit [330], UserDebit [340], Provider [350], and ProviderCredit [370] objects.
3. Retrieve Content from Content Service Provider Nodes [250]
4. Verifies User log in requests.
5. Maintains a connection to the Database [133] using the Data Access Component.

The User Interface Component [114] will establish a reference to this object when Users connect to the Portal.

The User Class

The User Class [320] represents a User Account of the System. An Instance (or object) of this class exists for each user that is logged in to the system. It provides the following functionality:
1. Maintains the state of User objects.
2. Maintains User object persistence in the User Table [520] using the Data Access Component.
3. Creates, retrieves and maintains UserCredit [330] and UserDebit [340] objects.
4. Maintains accounting of the User's Credits and Charges.
5. Verifies User passwords.

The UserCredit Class

The UserCredit Class [330] represents a User's purchase of Credits. It is used by user interface components, provided by the portal, that allow the User to purchase Content rights. It provides the following functionality:
1. Maintains the state of UserCredit objects.
2. Maintains UserCredit object persistence in the UserCredit Table [530] using the Data Access Component.

In addition, this class can maintain information on the specific Provider or Provider Content for which the credit can be used.

The UserDebit Class

The UserDebit Class [340] represents a charge for a User viewing Pay-per-view Content. Instances of this class exist when posting debits to the User's account. It provides the following functionality:
1. Maintains the state of UserDebit objects.
2. Maintains UserDebit object persistence in the UserDebit Table [540].

In addition, this class can maintain information on the specific Provider or Provider Content for which the User account was charged.

The Provider Class

The Provider Class [350] represents a Content Provider. Instances of this class exist when a User is using the Content from the Provider. It provides the following functionality:
1. Maintains the state of Provider objects.
2. Maintains Provider object persistence in the Provider Table [550] using the Data Access Component [131, 232].
3. Creates, retrieves and maintains ProviderContent [360] and ProviderCredit [370] objects.
4. Maintains accounting of the Providers Credits and Content Usage.
5. Retrieves, processes and returns the Content information.
6. Optionally maintains a cached version of the Content close to the Portal's Application Server.

The ProviderContent Class

The ProviderContent Class [360] represents a specific item of Pay-per-view Content. Instances of this class exist when a User is using the Content it represents. It provides the following functionality:

1. Maintains the state of ProviderContent objects.
2. Maintains ProviderContent object persistence in the ProviderContent Table [560] using the Data Access Components.
3. Creates, retrieves and maintains ProviderCredit [370] objects.
4. Retrieves, processes and returns the Content from Provider.
5. Optionally maintains a cached version of the Content closer to the Portal's Application Server The ProviderCredit Class The ProviderCredit Class [370] represents a credit for Provider Content that is being viewed. Instances of this class exist when posting a credit to the Provider's account. It provides the following functionality:
1. Maintains the state of ProviderCredit objects.
2. Maintains ProviderCredit object persistence in the ProviderCredit Table [570] using the Data Access Components.
3. Maintains accounting of fees earned during the session.

The Database

Figure 4:
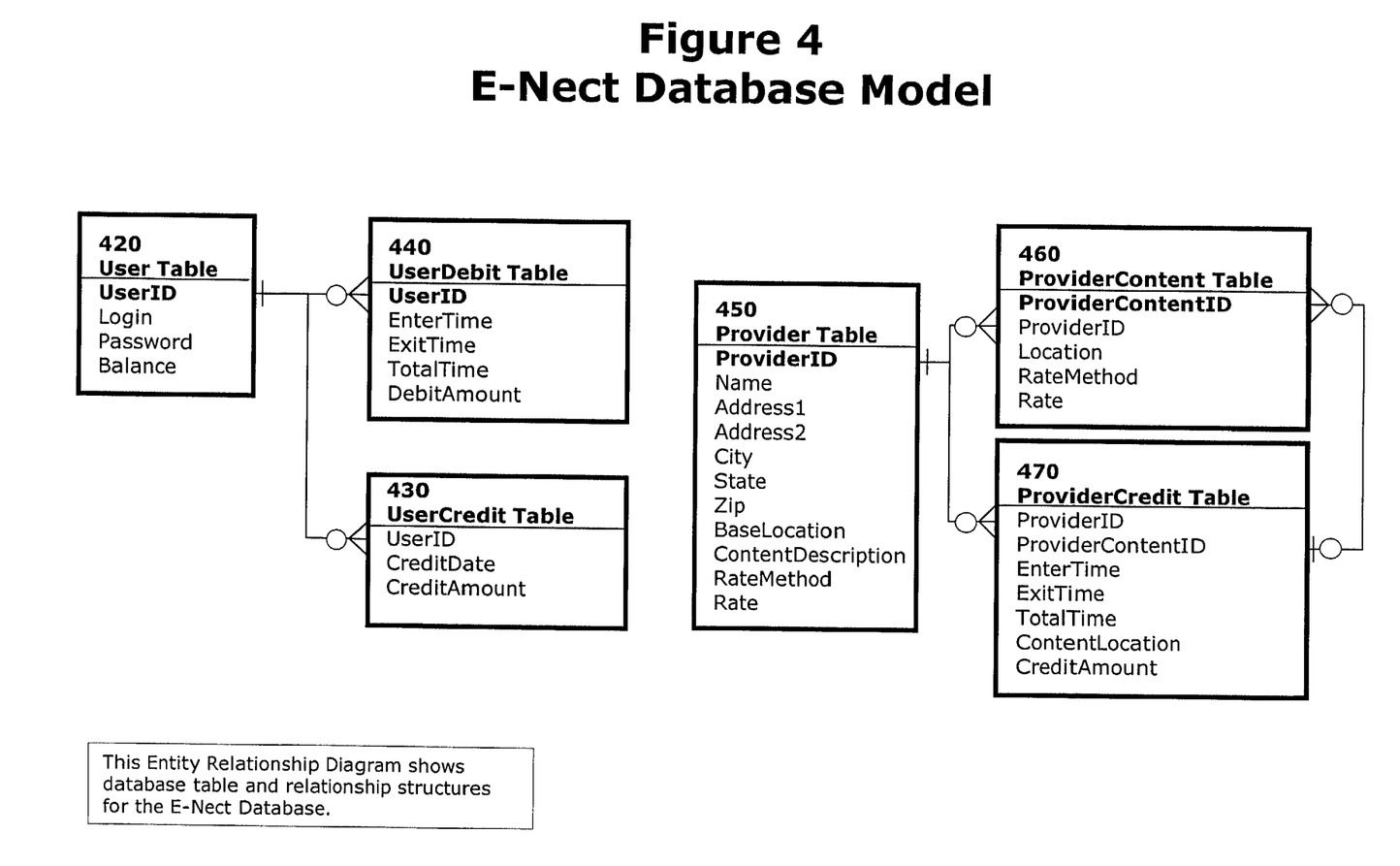

The preferred implementation is that of a relational database as outlined in FIG. 4—Database Model.

Database Overview

The Database defines the structure for information stored and maintained by the System. This database has the following objectives:
1. Persistently maintain the state of the objects and other data of the system.
2. Provide procedures for saving, retrieving and deleting data.

To accomplish these objectives the preferred implementation organizes the database into the following table definitions: User [420], UserCreditPurchase [430], UserSession [440], Provider [450], ProviderContent [460], and ProviderCredit [470].

The User Table

The User Table [420] is used to persist the state of User objects. It provides data fields for storing the User Id (a primary key that uniquely identifies each User), log in, User's credit balance, and other information.

The UserCredit Table

The UserCredit Table [430] is used to persist the state of UserCredit objects. It provides data fields for storing the User Id (a foreign key identifying the User credited), and the date and amount credited.

The UserDebit Table

The UserDebit Table [440] is used to persist the state of UserDebit objects. It provides data fields for storing the User Id (a foreign key identifying the User), the time the User entered and exited the Content, and the amount of debited to their account.

The Provider Table

The Provider Table [450] is used to persist the state of Provider objects. It provides data fields for storing the Provider Id (a primary key that uniquely identifies each Provider), name, address information, content location, and Content pricing information.

The ProviderContent Table

The ProviderContent Table [460] is used to persist the state of ProviderContent objects. It provides data fields for the Provider Content Id (a primary key that uniquely identifies each item of Provider Content), the Provider Id (a foreign key identifying the Provider), content location and pricing information. This table may also provide data elements for storing cached or local copies of the Content.

The ProviderCredit Table

The ProviderCredit Table [470] is used to persist the state of ProviderCredit object. It provides data fields for the Provider Id (a foreign key identifying the Provider), the Provider Content Id (a foreign key identifying a specific item of Provider Content (optional)), the time the Content was entered and exited, content location, and the amount of credited to the Provider account.

The Method

Figure 5:
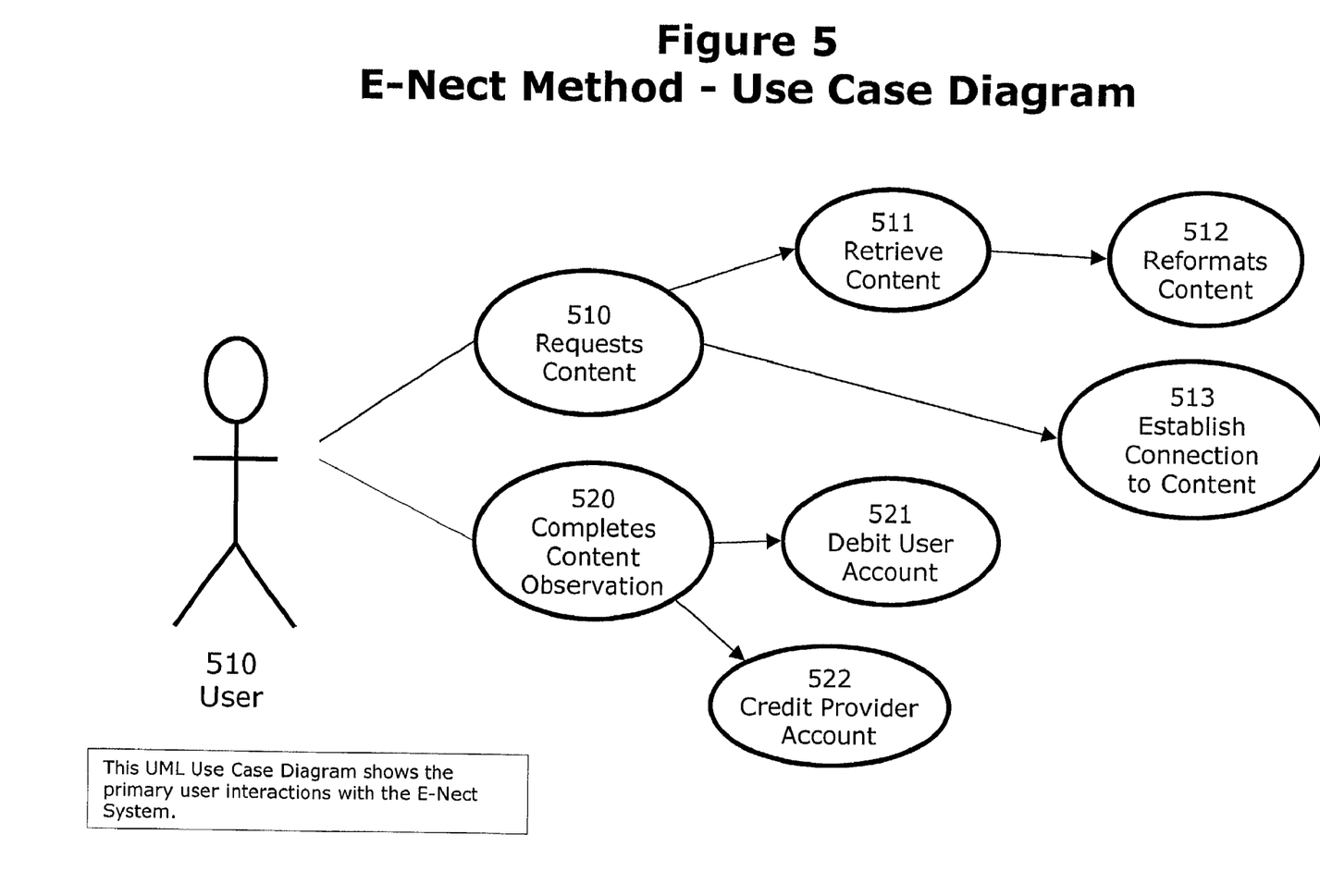
Figure 6:
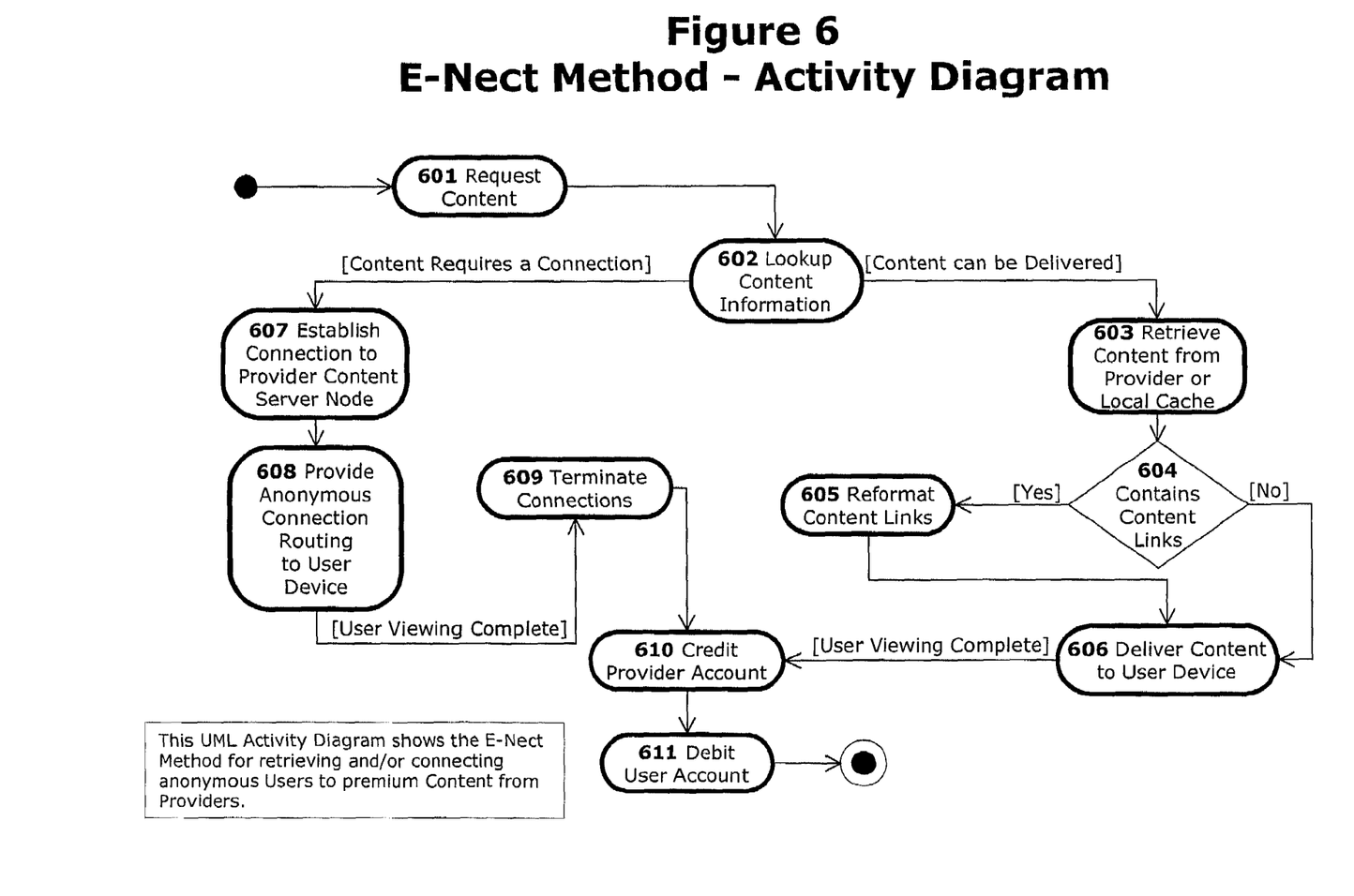
Figure 7:
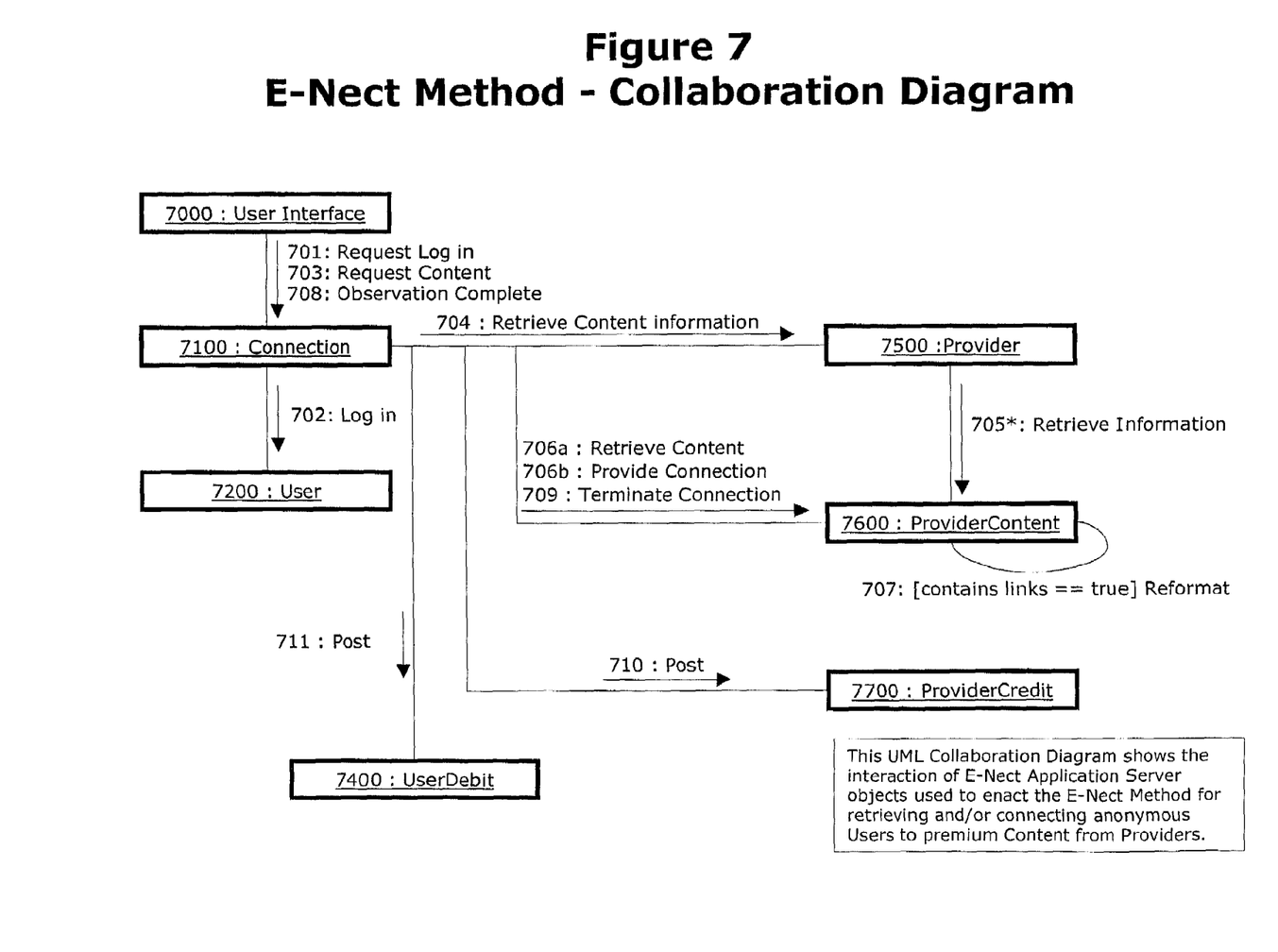
Figure 8:
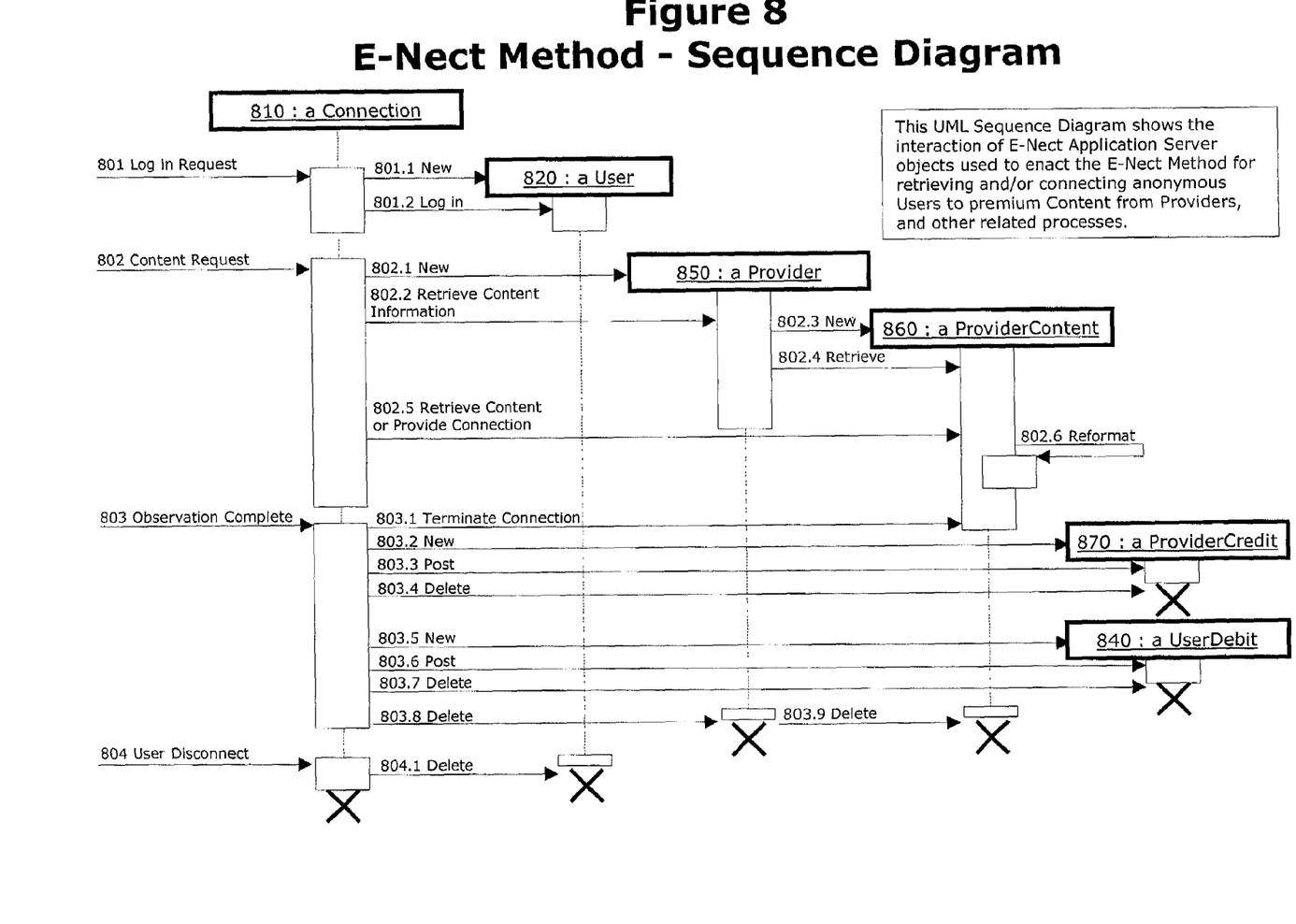

The process and preferred implementation of the Method is outlined in FIG. 5—Method—Use Case Diagram, FIG. 6—Activity Diagram, FIG. 7—Collaboration Diagram, and FIG. 8—Sequence Diagram.

The Process

The Process is the sequence of events used for delivering Pay-per-view Content to Anonymous Users. FIG. 5, a UML Activity Diagram, shows an overview of this process. The numbered items in the diagram represent the activities that take place during the process. Descriptions of these activities follow.

601. The User, via the User Device submits a request to the portal for an item or area of Content.
602. The System retrieves information about the content from the Database.
603. If the Content is of the type that can be delivered, the System will retrieve the actual Content from either the Content Provider Servers or from a local copy of cached version of the Content. This may be stored in the Database or other local storage system.
604. The Content is examined for the presence of direct links or requests to the Content Provider.
605. If the Content does contain such links, the links are reformatted or replaced by request links to the System. This will prevent the User from directly linking to the Content Provider, which nullify their anonymity.
606. The Content is delivered to the User Device via currently available technologies (i.e. web servers, database servers, telephone systems, cable systems, etc.).
607. Referring to Activity 602, If the Content is of the type that can not be delivered to the User anonymously and a connection to the Content Provider Nodes, then the system will establish a link to said Node acting as a proxy for the User.
608. The system will establish a link to the User Device acting as a proxy for the Server.

Content from the Provider will then be routed via these connections. The specific connections and routing technologies to be used are independent of the system and can be implemented using a variety of commercially available products.

609. When the User Interface Component notifies the System that User has completed observing the Content, any anonymously routed connections established between the User and Content Provider are Terminated.
610. A Credit for the observation of the Content is posted to the Provider's account.
611. A Debit for the observation of the Content is posted to the User's account.

User Interactions

For the viewing Pay-per-view Content anonymously, the User will have two primary interactions with the system: requesting Content from the Portal and completing the viewing of that content. FIG. 6, a UML Use Case Diagram shows the various interactions between the User and the System process.

The User may request content [510] through a wide variety of currently available technologies. These include but are not limited to the following:
1. Selecting content or provider link from the web site of the Portal.
2. Entering a content or provider identifier via a computer based data entry system.
3. Entering a content or provider identified via a prompt driven phone system.
4. Selecting a channel or other option via a set-top box or television.

The User Content request [510] will be honored by the system, either by retrieving [511] and possibly reformatting [512] the Content or by establishing an anonymously routed connection between the User Device and the Content Server [513].

The User may complete the observation of content [520] in a wide variety of ways that depend primarily on the implementation technology. These methods of completing the observation include but are not limited to the following:
1. Selecting a link to a different provider, or a different item or area of content via the user interface provided.
2. Selecting an option to logout of the system.
3. Closing or exiting the web browser or other viewing component.
4. Disconnecting of turning off the User Device.
5. Changing the channel on of turning of a set-top box or television.
6. Hanging up the phone.

When the User has notified the Portal, through one of the above or other means, that the Content observation is complete [520], the System will system will account for the session by posting a credit to the Provider's account [521] and a debit to the User's account [522]. To preserve User anonymity, no connection or links between these posting are maintained.

Component Object Interactions

The preferred implementation of the Method is an object-oriented software component as described earlier (Application Server Component). To achieve the objectives of the Method, objects (or class instances) in the Application Server Component collaborate with each other, each performing a particular task. Each object sends messages to others by calling the methods (or functions) that are provided by the other objects. FIG. 7, a UML Collaboration Diagram, shows the inter-object message scheme for the Application Server Component. Ordered descriptions of these messages follow:

701. An object from the User Interface Component [7000] sends a Log-In request to the Connection object [7100].
702. The Connection object [7100] sends a Log-in message to the User object [7200].
703. An object from the User Interface Component [7000] sends a Content request to the Connection object [7100].
704. The Connection object [7100] sends a Retrieve Content Information message to the Provider object [7500].
705. The Provider object [7500] sends a Retrieve Information message to the ProviderContent object [7600].
706. (a) If the Content can be delivered, the Connection object [7100] sends a Retrieve Content message to the ProviderContent object [7600]. (b) If the Content requires a all connection, the Content object [7100] sends a Provide Connection message to the ProviderContent object [7600].
707. If the Content contains direct links or requests to the Provider, the ProviderContent [7600] sends a Reformat message to itself.
708. An object from the User Interface Component [7000] sends an Observation Complete message to the Connection object [7100].
709. The Connection object [7100] sends a Terminate Connection message to the ProviderContent object [7600].
710. The Connection object [7100] sends a Post message to the ProviderCredit object [7700].
711. The Connection object [7100] sends a Post message to the UserDebit object [7400].

In addition to sending messages to other objects, some objects are responsible for the creation and deletion of objects. The Connection object is created by the User Interface Component a User connects to the System, and continues to exist until the user disconnects. Many other objects in the Application Server only need to exist for short periods of time. FIG. 8, a UML Sequence Diagram, shows the lifetime of such objects as various messages are processed by the Connection object [810].

Upon receiving a log-in request [801] from the User Interface Component, the Connection object [810] creates a new instance [801.1] of a User object [820]. The Connection object [810] then sends the Login message [801.2] to the User object [820]. The User object continues to exist until the User disconnects and the Connection object is deleted.

Upon receiving a content request [802] from the User Interface Component, the Connection object [810] creates a new instance [802.1] of a Provider Object [850]. The Connection object [810] then sends a Retrieve Content Request message [802.2] to the Provider object [850]. In response to this message, the Provider object [850] creates a new instance [802.3] of a ProviderContent object [860] and sends it the Retrieve Information message [802.4]. Both the Provider object [850] and the ProviderContent object [860] continue to exist until the User disconnects. After the Connection object [810] examines the Content information, it either sends the Retrieve Content or the Provide Connection message [802.5] to the ProviderContent object [860]. In response to the Retrieve Content message, the ProviderContent retrieves the Content and if necessary sends a Reformat message [802.6] to itself.

Upon receiving an observation complete message [803] from the User Interface Component, the Connection object [810], if a connection to the Content was provided, sends the Terminate Connection message [803.1] to the ProviderContent object [860]. It then creates anew instance [803.2] of a ProviderCredit [870], sends that object the Post message [803.3], and then deletes [803.4] the ProviderCredit object [870]. It then creates a new instance [803.5] of a UserDebit [840], sends that object the Post message [803.6], and then deletes [803.7] the UserDebit object [840]. The Connection object [810] then deletes [803.8] the Provider object [850]. This deletion cascades a deletion [803.9] to the ProviderContent object [860].

Upon receiving a user disconnect message [804] from the User Interface Component, the Connection object [810] deletes [804.1] the User object [820]. NOTE—If the user is observing content when the user disconnect message [804] is received, the Connection object [810] will send an Observation Complete message [803] to itself.

Resources Required for Implementation

Content Delivery and Viewing Platforms

As the design set forth herein is independent of any specific computing or other content delivery and viewing platform, the design can be applied to a wide variety of such platforms. Two distinct platforms are required: a content server and delivery platform and a user platform.

The types of content server and delivery platforms the design herein could be applied to include but are not limited to the following:
1. Windows based computers (i.e. Pentium computers running Windows operating system, web server, and data server software).
2. UNIX based computers (i.e. Sparc workstation running UNIX operating system, web server, and data server software).
3. Other server capable computers (i.e. Linux systems, Mainframes computers, etc.).
4. Broadcast, cable and satellite based television and radio systems.
5. Telephone systems.
6. Voice response, recognition and generation systems.

The types of user platforms the design herein could be applied to include but are not limited to the following:
1. Personal Computer systems (i.e. Windows, Macintosh, UNIX, Linux, etc.).
2. Internet access software (i.e. Microsoft Internet Explorer, Netscape Navigator, etc.).
3. Internet access devices (i.e. Internet terminals, television set-top boxes, etc.).
4. Computer based game systems.
5. Cable and satellite television and radio receivers.
6. Hand held and wearable computer devices.
7. Telephones Development Tools As the design set forth herein is independent of the specific implementation techniques, a wide variety of commercially available tools could be used to develop the components described. The types of tools that may be required include but are not limited to:
1. Object Oriented Programming tools (i.e. Visual C++, Visual Basic, Visual Age for Java, etc.)
2. Distributed Component Deployment tools (i.e. DCOM, CORBA, etc.)
3. Relational Database System (i.e. Oracle, MS SQL Server, IBM DB/2, etc.)
4. Web Component Development tools (i.e. Java, CGI, Perl, Visual Basic, Active Server Pages, etc.)
5. Browser and Other Component markup and scripting tools (i.e. JavaScript, VBScript, HTML, DHTML, etc.).
6. Broadcast, cable and satellite systems.
7. Telephone systems.

Programming and Other Talent

The programming talent required to build the preferred implementation is dependent primarily on the target operating platform of the system. Typical skill set may include the following:
1. Object-oriented programming language skills.
2. Component-based and multi-tier, client-server development skills.
3. Relation database programming skills.
4. Thin-client and web programming skills.
5. HTML and other presentation design skills.
6. Web Server and Database Server implementation and administration skills.
7. Broadcast, Cable and Satellite system programming skills.
8. Telephone system programming skills.

The design set forth herein is sufficient as to not require a programmer to create any new invention to implement the system. The techniques required to implement the various designs of the method and system are based on currently available and commonly known technologies, programming techniques and algorithms.

While a preferred embodiment and various alternatives have been set forth above, those skilled in the art will readily appreciate that other embodiments are possible within the scope of the invention. For example, communication networks other than the Internet, such as the public switched telephone network and proprietary data networks, can be used. Also, any hardware capable of use with such networks can be used. Furthermore, while the portal has been disclosed as usable with multiple providers, it can be used with only one provider. Moreover, different networks could be used to connect the system to the user and to the providers; for example, the user could dial up to the system, which would then function as an ISP in connecting the user to the providers. Therefore, the present invention should be construed as limited only by the appended claims.

We claim:

1. A system for allowing a user to access content from a provider, the system comprising:
    a server for establishing a first connection to the user and a second connection to the provider to access the content; and
    a database for maintaining accounting information for the user and for the provider;
    wherein the server communicates with the provider over the second connection to retrieve the content to be accessed by the user without disclosing identifying information about the user to the provider;
    wherein when the content comprises a link to further content, the server delivers the content to the user while reformatting the link to prevent the user from following the link to the further content, and wherein the server reformats the link to the further content by replacing the link to the further content with a modified link for accessing the further content through the server.

2. A system of claim 1, wherein the server retrieves the content from the provider and stores the content in a cache for delivery to the user.

3. A system of claim 1, wherein the server measures an amount of time the user spends viewing the content and enters the amount of time into the database.

4. A system of claim 1, wherein the server debits a fulfilled request from the user for the content from an account maintained for the user in the database without association to the provider or content requested.

5. A system of claim 4, wherein the fulfilled request is credited to an account maintained for the provider in the database without association to the user making the request.

6. A system of claim 1, wherein the database comprises an account for the user in which the user can purchase rights to view the content without association to the specific content that will be viewed or otherwise observed.

7. A system of claim 1, wherein the database stores a password which the user must provide before the user can access the content.

8. A system of claim 7, wherein the database stores, in association with the password, a preset amount of time for which the user is permitted to access the content using the password.

9. A system of claim 7, wherein the database stores, in association with the password, a preset amount of the content that the user is permitted to access using the password.

10. A system of claim 7, wherein the database stores, in association with the password, only information preset independently of the user.

* * * * *